United States Patent
Hardy et al.

(10) Patent No.: US 10,306,332 B2
(45) Date of Patent: May 28, 2019

(54) USE OF AUDIO SIGNALS TO PROVIDE INTERACTIVE CONTENT TO END USERS VIA SMART DEVICES

(71) Applicant: DISH Technologies L.L.C., Englewood, CO (US)

(72) Inventors: Christofer Hardy, Cheyenne, WY (US); Thomas Yarborough, Cheyenne, WY (US)

(73) Assignee: DISH Technologies L.L.C., Englewood, CO (US)

( * ) Notice: Subject to any disclaimer, the term of this patent is extended or adjusted under 35 U.S.C. 154(b) by 9 days.

(21) Appl. No.: 15/182,404

(22) Filed: Jun. 14, 2016

(65) Prior Publication Data

US 2017/0359627 A1 Dec. 14, 2017

(51) Int. Cl.
*H04N 21/81* (2011.01)
*H04N 21/61* (2011.01)
(Continued)

(52) U.S. Cl.
CPC ......... *H04N 21/812* (2013.01); *H04N 21/233* (2013.01); *H04N 21/2543* (2013.01);
(Continued)

(58) Field of Classification Search
None
See application file for complete search history.

(56) References Cited

U.S. PATENT DOCUMENTS

| 9,288,551 B2 | 3/2016 | Kummer |
| 9,621,960 B2 | 4/2017 | Hardy et al. |

(Continued)

FOREIGN PATENT DOCUMENTS

| WO | 2011/040999 A1 | 4/2011 |
| WO | 2014/072742 A1 | 5/2014 |
| WO | 2014/164782 A1 | 10/2014 |

OTHER PUBLICATIONS

U.S. Appl. No. 13/834,916, filed Mar. 15, 2013 Non-Final Rejection dated Aug. 18, 2016, all pages.
(Continued)

*Primary Examiner* — Michael R Telan
(74) *Attorney, Agent, or Firm* — Kilpatrick Townsend & Stockton LLP

(57) ABSTRACT

Various arrangements for providing interactive content to viewers of television programming are presented. A television service provider system may supplement broadcast television programming with a supplemental audio signal. The supplemental audio signal may not part of the broadcast television programming as received by the television service provider system from a content provider. The television service provider system may broadcast a data stream comprising the broadcast television programming and the supplemental audio signal via a television programming distribution network. A television receiver may receive the data stream and output the broadcast television programming and the supplemental audio signal. A viewer's mobile device may detect the supplemental audio signal using an on-board microphone of the mobile device. In response to the received supplemental audio signal, the mobile device may access interactive content and provide such interactive content to the viewer.

13 Claims, 7 Drawing Sheets

(51) Int. Cl.
  *H04N 21/00* (2011.01)
  *H04N 21/2543* (2011.01)
  *H04N 21/4784* (2011.01)
  *H04N 21/475* (2011.01)
  *H04N 21/258* (2011.01)
  *H04N 21/45* (2011.01)
  *H04N 21/233* (2011.01)

(52) U.S. Cl.
  CPC ... *H04N 21/25883* (2013.01); *H04N 21/4532* (2013.01); *H04N 21/4758* (2013.01); *H04N 21/4784* (2013.01); *H04N 21/6125* (2013.01)

(56) References Cited

U.S. PATENT DOCUMENTS

| | | | |
|---|---|---|---|
| 9,769,540 B2 | 9/2017 | Kummer | |
| 2002/0090198 A1 | 7/2002 | Rosenberg et al. | |
| 2003/0154475 A1 | 8/2003 | Rodriguez et al. | |
| 2003/0172376 A1 | 9/2003 | Coffin, III | |
| 2005/0091690 A1 | 4/2005 | Delpuch et al. | |
| 2007/0061830 A1* | 3/2007 | Chang | H04N 7/163 725/9 |
| 2007/0169165 A1 | 7/2007 | Crull et al. | |
| 2007/0288951 A1 | 12/2007 | Ray et al. | |
| 2008/0244666 A1 | 10/2008 | Moon et al. | |
| 2008/0244678 A1* | 10/2008 | Kim | H04N 21/235 725/118 |
| 2008/0270038 A1 | 10/2008 | Partovi et al. | |
| 2009/0210898 A1 | 8/2009 | Childress et al. | |
| 2009/0228911 A1 | 9/2009 | Vrijsen | |
| 2010/0064306 A1 | 3/2010 | Tiongson et al. | |
| 2010/0071007 A1 | 3/2010 | Meijer | |
| 2010/0125864 A1 | 5/2010 | Dwyer et al. | |
| 2010/0146560 A1 | 6/2010 | Bonfrer | |
| 2010/0218214 A1 | 8/2010 | Fan et al. | |
| 2010/0272257 A1* | 10/2010 | Beals | G06Q 20/1235 380/216 |
| 2010/0305729 A1* | 12/2010 | Glitsch | G06F 17/30026 700/94 |
| 2011/0082858 A1 | 4/2011 | Yu et al. | |
| 2011/0173337 A1 | 7/2011 | Walsh et al. | |
| 2011/0191417 A1 | 8/2011 | Rathod | |
| 2011/0295667 A1 | 12/2011 | Butler | |
| 2012/0110615 A1 | 5/2012 | Kilar et al. | |
| 2012/0110616 A1 | 5/2012 | Kilar et al. | |
| 2012/0124625 A1 | 5/2012 | Foote et al. | |
| 2012/0260295 A1 | 10/2012 | Rondeau | |
| 2012/0278834 A1 | 11/2012 | Richardson | |
| 2012/0284745 A1 | 11/2012 | Strong | |
| 2012/0295560 A1* | 11/2012 | Mufti | H04B 13/00 455/95 |
| 2013/0031216 A1 | 1/2013 | Willis et al. | |
| 2013/0071090 A1* | 3/2013 | Berkowitz | H04N 21/6547 386/248 |
| 2013/0268951 A1* | 10/2013 | Wyatt | H04N 21/25866 725/5 |
| 2013/0291037 A1 | 10/2013 | Im et al. | |
| 2014/0068692 A1 | 3/2014 | Archibong et al. | |
| 2014/0114966 A1 | 4/2014 | Bilinski et al. | |
| 2014/0150009 A1 | 5/2014 | Sharma | |
| 2014/0282744 A1 | 9/2014 | Hardy et al. | |
| 2014/0282779 A1 | 9/2014 | Navarro | |
| 2015/0150052 A1 | 5/2015 | Errico et al. | |
| 2015/0358687 A1 | 12/2015 | Kummer | |
| 2016/0088353 A1* | 3/2016 | Kim | H04N 21/25891 725/10 |

OTHER PUBLICATIONS

U.S. Appl. No. 13/801,932, filed Mar. 13, 2013 Notice of Allowance dated Nov. 25, 2016, all pages.
U.S. Appl. No. 13/834,916, filed Mar. 15, 2013 Final Office Action dated Mar. 13, 2017, all pages.
U.S. Appl. No. 14/297,279, filed Jun. 5, 2014 Non-Final Office Action dated Feb. 9, 2017, all pages.
International Search Report and Written Opinion for PCT/GB2015/052570 dated Dec. 11, 2015, 13 pages.
International Search Report and Written Opinion for PCT/US2014/023466 dated Jul. 10, 2014, 15 pages.
International Preliminary Report on Patentability for PCT/US2014/023466 dated Sep. 15, 2015, 8 pages.
U.S. Appl. No. 13/801,932, filed Mar. 13, 2013 Non Final Office Action dated Jun. 24, 2015, 21 pages.
U.S. Appl. No. 13/801,932, filed Mar. 13, 2013 Final Office Action dated Dec. 17, 2015, 23 pages.
U.S. Appl. No. 13/801,932, filed Mar. 13, 2013 Non-Final Rejection dated May 20, 2016, 28 pages.
U.S. Appl. No. 13/834,916, filed Mar. 15, 2013 dated Aug. 8, 2014, 19 pages.
U.S. Appl. No. 13/834,916, filed Mar. 15, 2013 Final Office Action dated Jan. 12, 2015, 22 pages.
U.S. Appl. No. 13/834,916, filed Mar. 15, 2013 Non Final Office Action dated Apr. 27, 2015, 22 pages.
U.S. Appl. No. 13/834,916, filed Mar. 15, 2013 Final Office Action dated Dec. 14, 2015, 31 pages.
U.S. Appl. No. 14/297,322, filed Jun. 5, 2014 Notice of Allowance dated Nov. 5, 2015, 34 pages.
U.S. Appl. No. 14/297,279, filed Jun. 5, 2014 Non-Final Office Action dated Nov. 5, 2015, 45 pages.
U.S. Appl. No. 14/297,279, filed Jun. 5, 2014 Final Rejection dated Apr. 22, 2016, 33 pages.
U.S. Appl. No. 13/834,916, filed Mar. 15, 2013 Non-Final Rejection dated Jun. 29, 2017, all pages.
U.S. Appl. No. 14/297,279, filed Jun. 5, 2014 Notice of Allowance dated May 19, 2017, all pages.
U.S. Appl. No. 13/834,916, filed Mar. 15, 2013 Final Rejection dated Dec. 29, 2017, all pages.

* cited by examiner

USE OF AUDIO SIGNALS TO PROVIDE INTERACTIVE CONTENT TO END USERS VIA SMART DEVICES

BACKGROUND

Presenting television commercials to television viewers is one time-honored way of advertisers reaching consumers. However, such advertising is primitive in that viewers do not typically provide feedback on their reaction to the advertising or other data that would be useful to the advertiser. Embodiments detailed herein provide new systems and methods that allow for increased viewer feedback in response to advertisements and other content.

SUMMARY

Various arrangements, including systems and methods, for providing interactive content to viewers of television programming are presented. A television service provider system may supplement broadcast television programming with a supplemental audio signal. The supplemental audio signal may not be part of the broadcast television programming as received by the television service provider system from a content provider. The television service provider system may broadcast a data stream comprising the broadcast television programming and the supplemental audio signal via a television programming distribution network. A television receiver may receive the data stream comprising the broadcast television programming and the supplemental audio signal. The television receiver may output the supplemental audio signal and the broadcast television programming. A mobile device of a viewer of the broadcast television programming may detect the supplemental audio signal using an on-board microphone of the mobile device. In response to the received supplemental audio signal, the mobile device may access interactive content, wherein the interactive content requests a response from the viewer. The television service provider system may receive the response from the viewer transmitted via a network distinct from the television programming distribution network.

Embodiments of such methods and systems may include one or more of the following features: In response to receiving the response from the viewer transmitted via the network, a user account linked with the viewer may be credited with an incentive value. Supplementing the supplemental audio signal with the television programming may include identifying each packet of the supplemental audio signal using a packet identifier (PID) distinct from one or more PIDs that identify one or more audio programs of the television programming. The supplemental audio signal, as output, may be ultrasonic. Outputting of the supplemental audio signal may be performed using an ultrasonic transducer of the television receiver. Outputting of the supplemental audio signal may include transmitting the supplemental audio signal to an audiovisual system in communication with the television receiver. The mobile device may execute an application that monitors for audio within a particular frequency range, wherein the supplemental audio signal is received by the mobile device within the particular frequency range. The interactive content may request information from the viewer about the television programming. Detection of the supplemental audio signal is performed by a plurality of mobile devices located in proximity to the output supplemental audio signal. Each mobile device of the plurality of mobile devices may be associated with a different viewer of a plurality of viewers. Each mobile device of the plurality of mobile devices located in proximity to the output supplemental audio signal may access the interactive content. The television service provider system may receive responses from each viewer of the plurality of viewers via the plurality of mobile devices. The television service provider system may pool a plurality of incentive value awarded for each response such that the plurality of incentive values are awarded to a single user account associated with the viewer.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
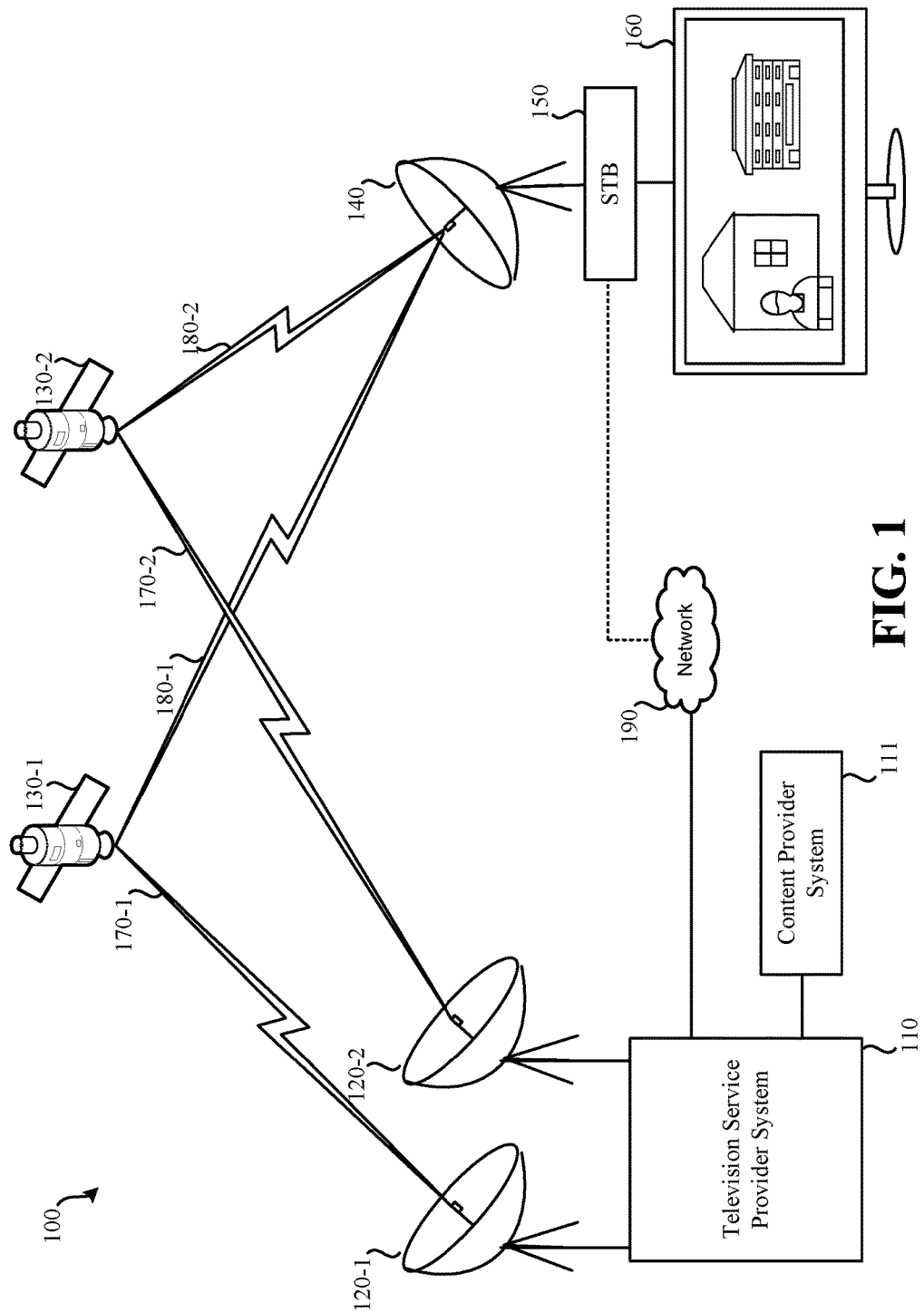
FIG. 1 illustrates an embodiment of a satellite television distribution system.

In order for a viewer to provide feedback on televised content, the viewer needs a way to transmit information to the television service provider (or some other third-party that is collecting such feedback). Some types of television programming distribution systems, such as over-the-air and satellite-based broadcast systems may typically be unidirectional. That is, data can be broadcast to a large number of television receivers and, possibly, addressed to specific television receivers, but the individual television receivers may not communicate back with the television service provider via the same route. In situations where a television receiver can transmit information to the television service provider via a same or different route (e.g., the television receiver is connected with the Internet), viewer feedback to the television receiver may be cumbersome and inconvenient to collect, especially if multiple viewers are attempting to interact with the television receiver at the same time. For example, interactions with a television receiver may typically be performed using a remote control. If multiple users are trying to interact with the television receiver, multiple remote controls may be needed or the users may need to share one or more remote controls. Further, if viewers are to provide feedback via a television receiver, this would likely involve some form of graphical interface being presented over content being output by the television receiver, interfering with the ability of the viewers to watch and enjoy the television programming.

Feedback to a television service provider can be provided via a route other than through the television receiver as detailed herein. By providing feedback from viewers via mobile devices, such as smart phones, home automation devices, or other computerized devices that can connect with the Internet, it may be possible to overcome the inability of some television receivers to communicate back with a television service provider and provide multiple viewers with the ability to provide feedback substantially contemporaneously via their own mobile devices. By providing such opportunities for feedback via mobile devices, the content being presented or viewed via a presentation device as output by the television receiver may not be altered, such as through an overlay or other visual interface that would interfere with viewing of broadcast content or other content. Thus, one or more viewers may desire to provide feedback while other viewers viewing the same programming with the viewer may watch the television programming without visual or auditory interruption.

An obstacle to providing a feedback channel through mobile devices is coordination between the television receiver and the mobile device such that the mobile device prompts the viewer for feedback at the appropriate time and with appropriate interactive content that corresponds to the content being viewed by the viewers. A television service provider may desire to receive feedback on specific instances of content, such as advertisements or television programs output for presentation by the television receiver. For example, if a television commercial for a new car model is broadcast, when the television commercial concludes, the television service provider may desire to receive feedback via interactive content in real-time or near real-time (e.g., within 30 seconds, within 2 minutes) from the one or more viewers who viewed the television commercial, such as about whether they viewed the television commercial, whether they liked the television commercial, whether they were interested in more information about the new car model, or any other question that the television service provider or advertiser who distributed the television commercial may wish to learn from the viewers.

In order to coordinate between the television receiver and the mobile devices of one or more viewers, the television service provider may supplement a broadcast of television content with coded audio signals. These audio signals may be ultrasonic or otherwise outside the typical audible range of a human (e.g., above 20 kHz). When the television programming is output by the television receiver, the supplemental audio signals may also be output, either directly by the television receiver (via an ultrasonic transducer) or via an external audio system, which may be part of the television or other form of presentation device. It should be understood that the supplemental audio signal is not part of the original television programming produced by a content provider. That is, a television commercial produced by an advertiser may be supplemented by the television service provider with the supplemental audio signals prior to broadcast.

Mobile devices of one or more viewers may be set to a state (e.g., via executing an application) that enables a microphone of the mobile devices to monitor for output supplemental audio signals within a particular frequency range. These audio signals may contain data that triggers the mobile device to retrieve particular interactive content from a television service provider's feedback server system. The particular interactive content may be linked to the particular television programming to which the supplemental audio signal was linked by the television service provider. For example, the supplemental audio signal may include an identifier. On receipt of this identifier from a mobile device, the television service provider can determine which piece of content the viewer associated with the mobile device has recently viewed. Corresponding interactive content may be transmitted via the Internet to the viewer's mobile device, to which the viewer may provide one or more responses. The viewer may be incentivized to provide such responses in order to receive one or more benefits, such as: credit to a monthly subscription with the television service provider, a reduced duration or number of television commercials, access to free pay-per-view content, access to promotional materials, access to additional television channels, payment, a special deal on the product or service of the advertisement, or any other incentive that the television provider or advertiser desires to provide in order to encourage viewers to provide feedback via the system.

FIG. 1 illustrates an embodiment of a satellite television distribution system 100. Satellite television distribution system 100 may include: television service provider system 110, satellite transmitter equipment 120, satellites 130, satellite dish 140, set top box 150, and television 160. Alternate embodiments of satellite television distribution system 100 may include fewer or greater numbers of components. While only one satellite dish 140, set top box 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to viewers. Television service provider system 110 may receive feeds of one or more television channels from various sources, such as content provider system 111. Content provider system 111 may provide television programs, advertisements, and other forms of distributable content. For example, content provider system 111 may be a television network, such as ESPN®. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. Such satellite feeds may be unidirectional—user equipment may not be able to transmit information back to television service provider system 110 via satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels and content may be transmitted to satellites 130 from different instances of transmitting equipment.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink transponder stream signals 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
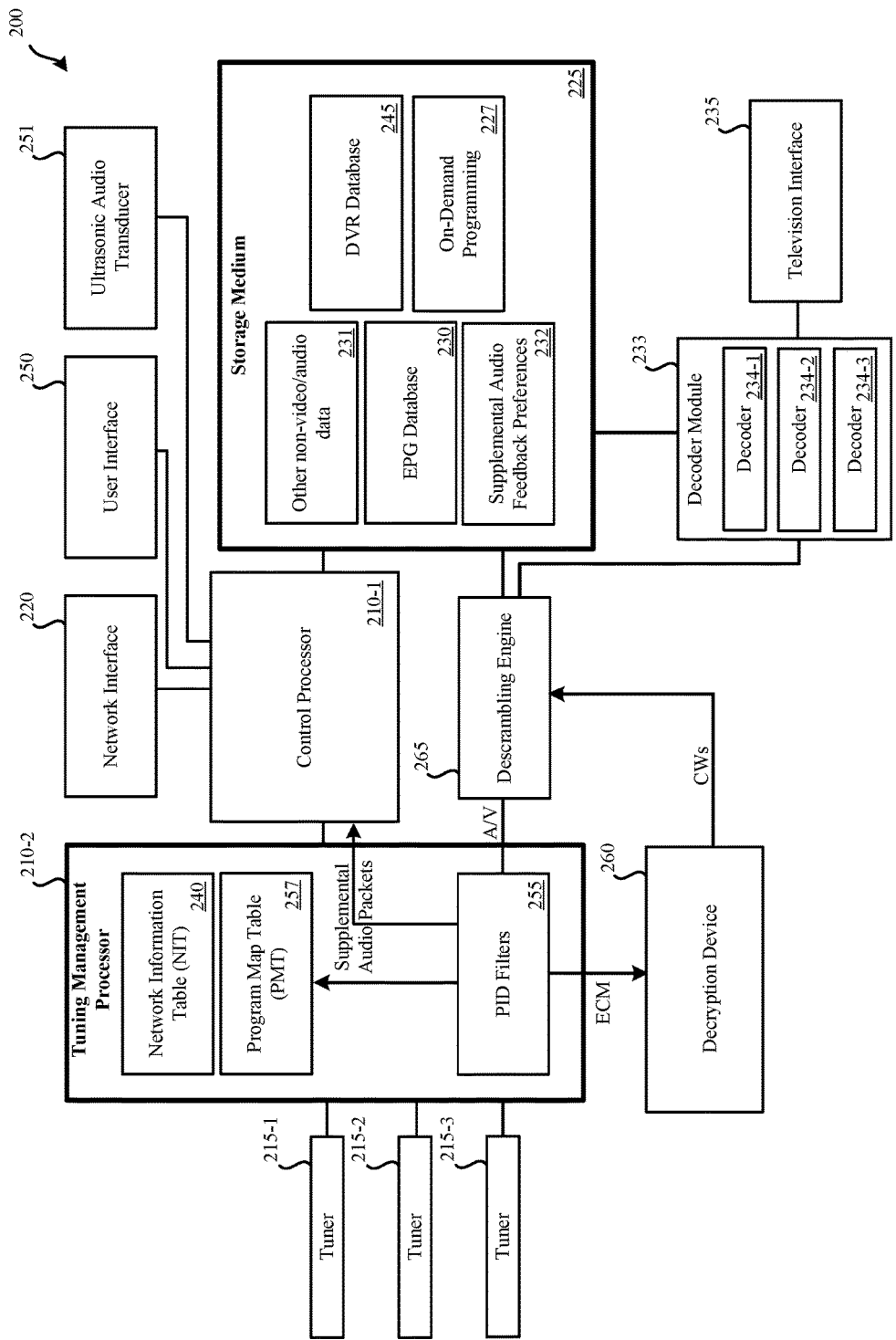
FIG. 2 illustrates an embodiment of a television receiver that processes received supplemental audio content.

In communication with satellite dish 140 may be one or more sets of receiving equipment. Receiving equipment may be configured to decode signals received from satellites 130 via satellite dish 140 for display on a display or presentation device, such as television 160. Receiving equipment may be incorporated as part of a television or may be part of a separate device, commonly referred to as a set top box (STB). Receiving equipment may include a satellite tuner configured to receive television channels via a satellite. In FIG. 1, receiving equipment is present in the form of set top box 150. As such, set top box 150 may decode signals received via satellite dish 140 and provide an output to television 160. FIG. 2 provides additional detail of receiving equipment. A television receiver, such as detailed in relation to FIG. 2, includes STBs and similar componentry that is incorporated as part of another device, such as a television.

Television 160 may be used to present video and/or audio decoded by set top box 150. Set top box 150 may also output a display of one or more interfaces to television 160, such as an electronic programming guide (EPG). In some embodiments, a display device other than a television may be used.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set top box 150. Via such a secondary communication channel, bidirectional exchange of data may occur. As such, data may be transmitted to television service provider system 110 via network 190. The connection between network 190 and STB 150 is illustrated as dotted since this connection allowing communications from STB 150 to be sent to television service provider system 110 may not be available (e.g., STB 150 may not have such communication capabilities, STB 150 may have such capabilities but may not be connected with network 190). For example, even if an STB is capable of communicating using network 190, communication using network 190 may require that the user has an active account with an Internet service provider. Accordingly, some STBs may only be able to receive data from satellites 130 via receiving equipment such as satellite dish 140. In other situations, while a user may have an active ISP account, such as via a fiber, cable, or DSL internet connection, equipment failure may occur. For instance, a router through which STB 150 connects to network 190 may fail or be in need of resetting. Network 190 may be or include the Internet.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. Other forms of television distribution networks include broadcast over-the-air systems and IP-based distribution systems.

FIG. 2 illustrates an embodiment of a television receiver 200 that can process received supplemental audio content. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent STB 150 of FIG. 1 and may be in the form of an STB that communicates with a display device such as a television. Television receiver 200 may be incorporated as part of a television, such as television 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, networking information table (NIT) 240, digital video recorder (DVR) database 245 (which may include provider-managed television programming storage and/or user-defined television programming), on-demand programming 227, supplemental audio feedback preferences 232, commercial database 246, user interface 250, ultrasonic audio transducer 251, decryption device 260, decoder module 233, television interface 235, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may enforce supplemental audio feedback preferences 232 via communication with tuning management processor 210-2. Supplemental audio feedback preferences 232 may indicate, generally, whether one or more viewers of the television desire to participate in an interactive feedback program. Supplemental audio feedback preferences 232 may store a user preference indicating: whether or not participation is enabled or disabled; one or more days of the week and/or time periods when participation is enabled or disabled; for which channels and/or types of content participation is enabled (e.g., live broadcast programming, on-demand programming, content recorded via DVR functionality of the television receiver); and one or more user accounts associated with the feedback. Supplemental audio feedback preferences 232 may be enforced through the use of a packet identifier filter of PID filters 255. Therefore, when the feedback program is enabled, a PID filter may be enforced by PID filters 255 to receive supplemental audio content and route to control processor 210-1 and, possibly, to ultrasonic audio transducer 251. When the feedback program is disabled, no PID filter 255 may be enforced to capture supplemental audio content. As such, the supplemental audio content may be ignored and discarded by tuning management processor 210-2.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet.

Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, supplemental audio feedback preferences 232, other non-video/audio data 231, DVR database 245, commercial database 246, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of desired television channels), frequency identifiers and/or transponder identifiers for various television channels. In some embodiments, NIT 240 may contain additional data or additional tables may be stored by the television receiver.

For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs (e.g., first and second audio programs), supplementary audio content, and/or video PIDs. A PMT stores data on ECM (entitlement control message) PIDs for television channels that are transmitted on a transponder stream. If, for a first television channel, multiple television channels are to be tuned to, NIT 240 and/or PMT 257 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the television receiver having its associated supplemental audio content PID. This PID could be distinct from any of the audio programs of the television programming (e.g., the first audio program, second audio program (SAP)). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program map table that indicates the PIDs for audio and video streams of television channels transmitted by that transponder.

While a large portion of storage space of storage medium 225 can be devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 231.

Decoder module 233 may serve to convert encoded video and audio into a format suitable for output to a display device. For instance, Decoder module 233 may receive MPEG video and audio from storage medium 225 or descrambling engine 265 to be output to a television. MPEG video and audio from storage medium 224 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time.

While a television channel is being decoded by a decoder of decoders 234, the television channel is not necessarily output to a display device via television interface 235. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of decoder module 233 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames can be properly decoded. The output of the decoder, which is provided to television interface 235, may be controlled by control processor 210-1 or some other processor. While decoder module 233 is illustrated as having three decoders 234 (decoder 234-1, decoder 234-2, and decoder 234-3), in other embodiments, a greater or fewer number of decoders may be present in television receiver 200.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at STB 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming 227 may not be user-selected. As such, the television programming stored to on-demand programming storage 227 may be the same for each television receiver of a television service provider.

It should be understood that just as supplemental audio may be supplemental and either activated or deactivated in live broadcast programming, supplemental audio may be used to trigger interactive content in relation to recorded and on-demand content.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Ultrasonic audio transducer 251 may be a component of television receiver 200 that allows ultrasonic sound to be generated in accordance with supplemental audio content received and processed by processors 210. Ultrasonic audio transducer 251 may operate in a frequency range above or near 20 kHz to prevent the generated sound from being heard by a user. In other embodiments, sound may be generated within a human's audible range, below 20 kHz. An advantage of using a dedicated ultrasonic audio transducer 251 is that the generated sound may not be controlled or affected by user-set mute and volume settings provided to a separate audio system. In some embodiments, rather than a dedicated audio transducer being incorporated as part of television receiver 200, supplemental audio may be output via television interface 235, similar to the audio program of the television programming. The supplemental audio may then be output by the presentation device or separate audio system (which may also be used to reproduce the audio of the television program). Such reproduction may occur at an ultrasonic or audible frequency. The television receiver may be configured such that the magnitude of the supplemental audio output by the television receiver may not be affected by volume and mute settings.

Supplemental audio output via ultrasonic audio transducer 251 may have an identifier of television receiver 200 appended as part of the supplemental audio (e.g., by control processor 210-2). By including such an identifier of the television receiver as part of the supplemental audio, the television receiver's identifier can be relayed by the mobile device to a feedback server of the television service provider and, based on the television receiver's identifier, the feedback server can determine where the viewers are viewing content.

In some embodiments, rather than using an ultrasonic audio transducer, or, more generally, audio-based communication, a wireless communication interface that uses an alternate form of data communication may be used between the television receiver and one or more mobile devices. For instance, WiFi, Bluetooth®, Bluetooth Low Energy® (BLE), WiFi Direct® or some other form of local wireless communication protocol may be substituted for audio-based communication. If such an alternate form of communication is used and the television receiver is connected with network 190, feedback from interactive content may be transmitted to television service provider system 110 via television receiver 200.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption device 260 to decrypt ECMs. Decryption of an ECM may only be possible if the user has authorization to access the particular television channel associated with the ECM. When an ECM is determined to correspond to a television channel being stored and/or displayed, the ECM may be provided to decryption device 260 for decryption.

Decryption device 260 may be a removable or non-removable smart card. When decryption device 260 receives an encrypted ECM, decryption device 260 may decrypt the ECM to obtain some number of control words. In some embodiments, from each ECM received by decryption device 260, two control words are obtained. Decryption device 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to capture: (1) the video packets associated with the television channel; (2) the audio packets associated with an audio program of the television channel; and (3), if enabled, supplemental audio content used to trigger retrieval of interactive content. PMT 257 may store the particular assignments of PIDs for individual television channels. For example, if a transponder data stream includes multiple television channels, data packets corresponding to a television channel that is not desired to be stored or displayed by the user may be ignored by PID filters 255 and not routed to descrambling engine 265, decryption device 260 or control processor 210-1. As such, only data packets corresponding to the one or more television channels desired to be stored and/or displayed may be filtered and passed to either descrambling engine 265 or decryption device 260; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by decryption device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by decryption device 260 to be used for successful descrambling may be indicated by a scramble control identifier present within the data packet containing the scrambled video or audio.

Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules.

Figure 3:
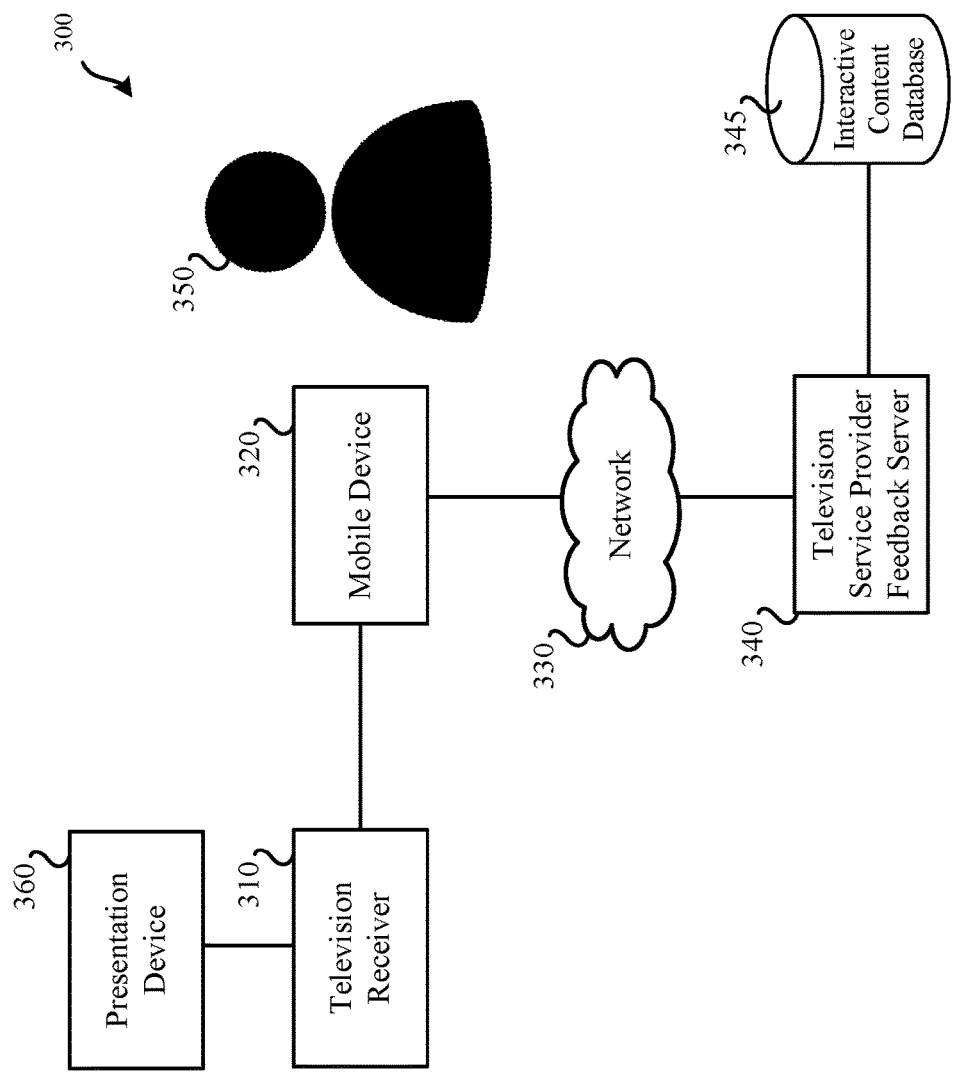
FIG. 3 illustrates an embodiment of a system for using audio signals to provide interactive content to one or more end users via mobile devices.

FIG. 3 illustrates an embodiment of a system 300 for using audio signals to provide interactive content to one or more end viewers via mobile devices. System 300 can include television receiver 310, mobile device 320, network 330, television service provider feedback server 340, and presentation device 360 (e.g., television). Television receiver 310 may represent set top box 150 of FIG. 1 and/or television receiver 200 of FIG. 2. Television receiver 310 may receive television programming and additional supplemental audio content via a television service provider's network, such as the distribution network illustrated as part of FIG. 1. Television receiver 310 may transmit data, such as via ultrasonic audio or a wireless data communication link, to mobile device 320 that corresponds to currently-output television programming (e.g., live broadcast television programming, on-demand programming, recorded programming).

Mobile device 320 can represent various types of mobile devices, such as a smart phone, tablet computer, laptop computer, smart watch, or other form of computerized device that can present information to viewer 350 and communicate with television service provider feedback server 340 via the Internet. In some embodiments, mobile device 320 may be a home automation device that can present information to a user, such as an appliance, thermostat, or some other type of device tending to be located in the vicinity of a television. It should be understood that such devices may be used as mobile device 320 even if not necessarily mobile (e.g., an appliance that is located in a fixed location). Mobile device 320 can have a touchscreen or display that allows information to be presented to the viewer. Interactive content presented by mobile device 320 to viewer 350 from television service provider feedback server 340 may be only visual, such that audio does not interfere with audio currently being output by television receiver 310 in relation to television programming.

Mobile device 320 may monitor a particular frequency range via one or more microphones to determine if supplemental audio content is being output by television receiver 310. In response to received supplemental audio content or wireless data from television receiver 310, mobile device 320 may retrieve interactive content from television service provider feedback server ("feedback server") 340 via network 330. Network 330 can represent one or more networks, such as a wireless local area network (WLAN) and the Internet. The request transmitted by mobile device 320 may include an identifier from the supplemental audio. This identifier may be unique from other identifiers transmitted recently as part of other supplemental audio content. As such, when feedback server 340 receives the identifier, feedback server 340 can perform a database lookup or other form of lookup to determine the television programming that is currently being viewed by viewer 350 on presentation device 360.

Television service provider feedback server 340 may provide interactive content to mobile device 320 based on the received identifier and/or an indication of viewer account receiver as part of the request from mobile device 320. Television service provider feedback server 340 may retrieve interactive content from interactive content database 345 based on the received identifier and/or the indication of the viewer account. Interactive content database 345 may relate supplemental audio identifiers to specific instances of interactive content. The interactive content provided to mobile device 320 may vary based on characteristics of viewer 350. Feedback server 340 may have access to demographic data of viewer 350, such as: age, sex, income level, geographic location/region, political affiliation, interests, etc. Whether and which specific interactive content provided to mobile device 320 may be based on: the received identifier (which is indicative of the television programming currently being viewed by viewer 350 on presentation device 360), demographic data of viewer 350, the time of day, the day of week, and how recently other interactive content has been provided to mobile device 320 (e.g., a maximum limit of interactive content for a period of time may be established).

Once received, mobile device 320 may present the interactive content such as via an application executed by mobile device 320. In some embodiments, the interactive content may be provided in a browser of mobile device 320. Viewer 350 may then view and/or interact with the interactive content. For instance a video and/or questions or may be presented to viewer 350. Viewer 350 may provide one or more responses, which are then transmitted to feedback server 340 via network 330. Feedback server 340 logs the results and, possibly, credits a user account linked with viewer 350 with an incentive value in response to the feedback being provided by viewer 350.

Figure 4:
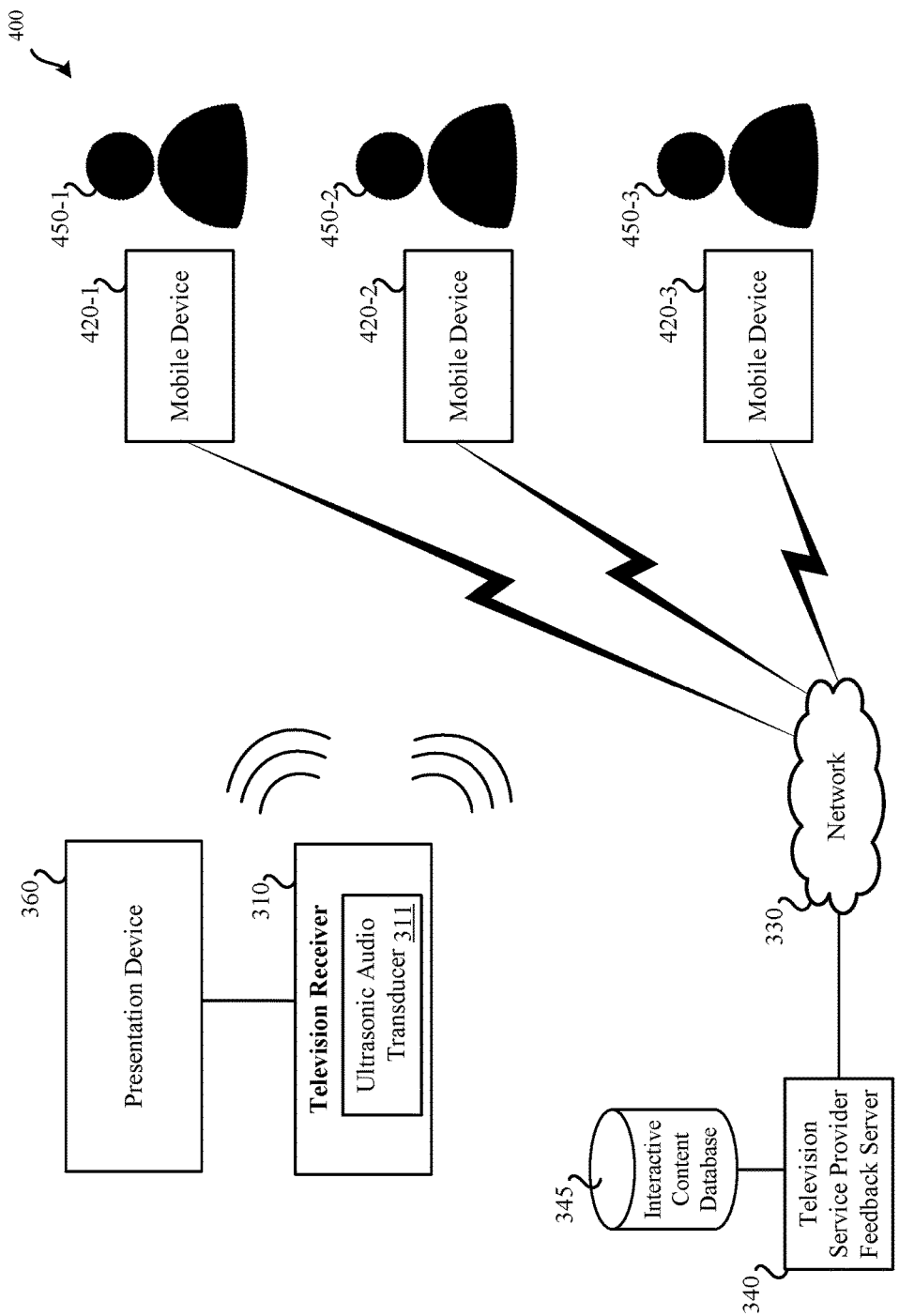
FIG. 4 illustrates another embodiment of a system for using audio signals to provide interactive content to one or more end users via mobile devices.

FIG. 4 illustrates an embodiment of a system 400 for using audio signals to provide interactive content to multiple end users via mobile devices. System 400 may function similarly to system 300 of FIG. 3, but may allow for feedback to be simultaneously solicited from multiple users. In system 400, viewers 450 (viewer 450-1, 450-2, and 450-3) are together viewing presentation device 360. Television programming is output to presentation device 360 from television receiver 310, which has an on-board ultrasonic audio transducer 311 (which may function as detailed in relation to ultrasonic audio transducer 251 of FIG. 2). Mobile device 420 (420-1, 420-2, and 420-3) can simultaneously (or within a short period of time) receive supplemental audio content from ultrasonic audio transducer 311.

Via mobile devices 420, each of viewers 450 may be solicited for feedback. In response to supplemental audio, each of mobile devices 420 may transmit a request to feedback server 340, the request including the identifier received as part of the supplemental audio and an indication of a user account. (The user account may vary per by viewer or may be the same for each of viewers 450.) Each of viewers 450 may be provided the same interactive content or may be provided different interactive content as retrieved from interactive content database 345. It may be possible that only a subset of viewers 450 is solicited for feedback. For instance, based on demographic data accessible by feedback server 340, feedback may only be desired from a subset of viewers 450. Based on such demographic data, which viewers feedback is to be solicited from and what interactive content is to be provided may be determined. When a mobile device receives interactive content, the mobile device may alert the associated viewer via a pop-up message, ring, vibration, or other form of alert.

Regardless of whether each of viewers 450 is associated with different user accounts or the same user account, it may be possible for incentives to be pooled. Television receiver 310 may be associated with a master account which receives incentive value associated with multiple user accounts. For example, user accounts of each of viewers 450 may be associated with a single master account. When any of viewers 450 provide feedback, an associated incentive value is credited to the master account. Therefore, for example, if a single piece of interactive content is provided to each of mobile device 420 and each of viewers 450 provide feedback (their answers may, of course, differ from each other), the master account associated with television receiver 310 may receive triple the incentive value as compared to if only one of viewers 450 had responded. A master account may be an account of one of viewers 450 selected to be the master account or a separate account associated with television receiver 310.

In some embodiments, in addition to an identifier being part of the supplemental audio content, television receiver 310 may append an identifier specific to the television receiver as part of the supplemental audio content. Therefore, each mobile device may receive this additional supplemental identifier of the television receiver. In the request for interactive content transmitted by each of mobile device 420 to feedback server 340 the television receiver's identifier can be included, such that it can be determined at which television receiver each of viewers 450 is viewing content.

The amount of incentive offered may vary by viewer in addition or alternatively to the interactive content. For instance, if feedback from a particular demographic group of viewers is more highly desirable than another, the incentive value offered to viewers in the particular demographic group may be increased as compared to other demographic groups in order to incentivize feedback being provided. For example, viewer 450-1 may be offered 5 credits of incentive value while viewer 450-2 is only offered 3 credits due to viewer 450-1 being a female between the ages of 15-21 while viewer 450-2 was a male between the ages of 40-49.

While FIG. 4 illustrates three viewers, it should be understood that fewer viewers or a greater number of viewers may be involved in using system 400 to provide feedback. In embodiments that use ultrasonic audio for communication between television receiver 310 and mobile device 420, since a communication link does not need to be established, there may be no limit on the number of mobile devices that can receive supplemental audio, as long as the mobile devices are within range to receive the supplemental audio. Therefore, for example, at a Super Bowl party, dozens of viewers may be watching presentation device 360 simultaneously. During a live broadcast or television programming (e.g., a commercial), each viewer may be solicited for feedback about the commercial, such as inquiring whether the viewer found the commercial funny.

Figure 5:
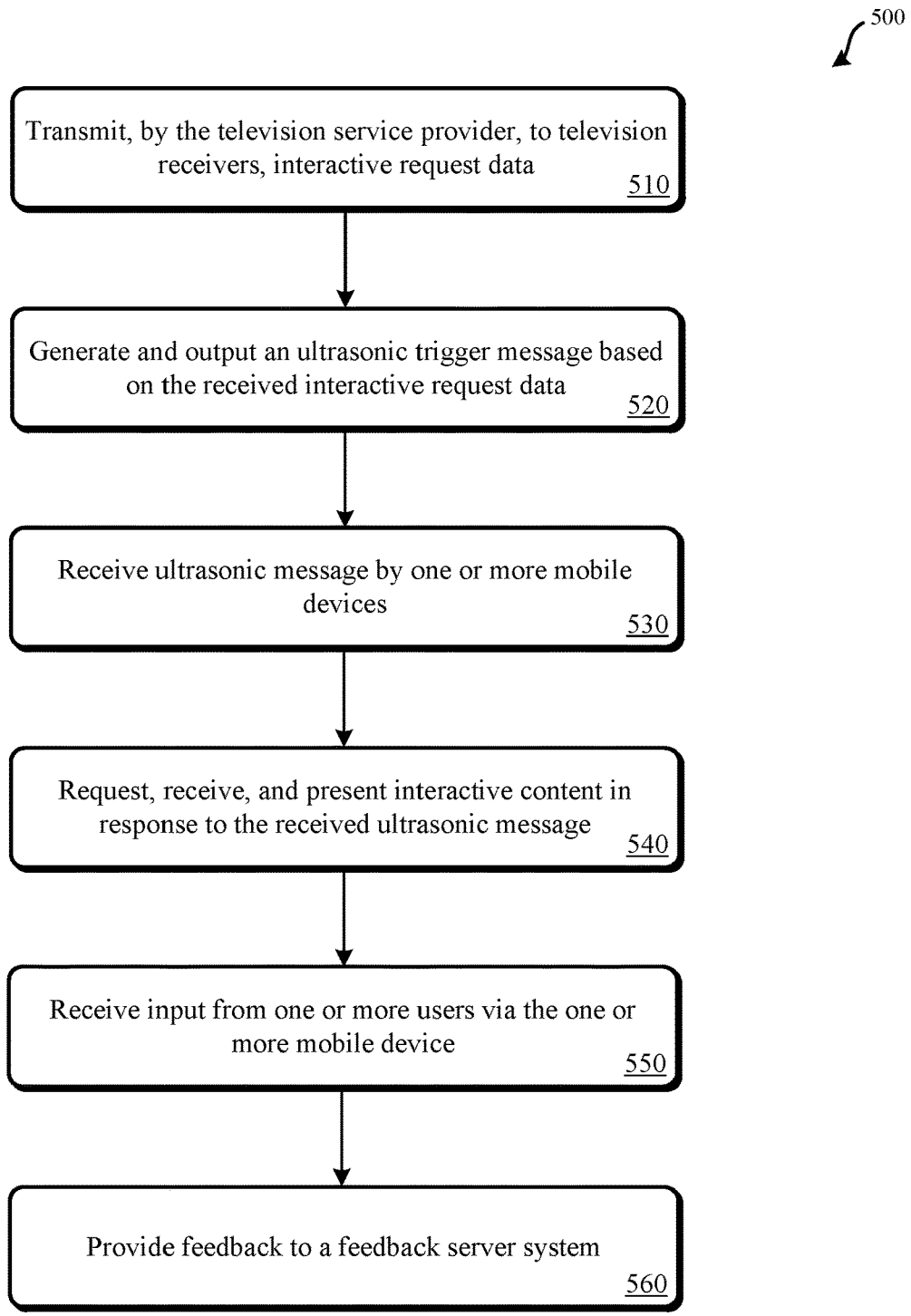
FIG. 5 illustrates an embodiment of a method for using audio signals to provide interactive content to one or more end users via mobile devices.

Various methods can be performed in conjunction with the systems detailed in FIGS. 1-4. FIG. 5 illustrates an embodiment of a method 500 for using audio signals to provide interactive content to one or more end users via mobile devices. Method 500 may be performed using satellite television distribution system 100, television receiver 200, and/or systems 300 and 400.

At block 510, a television service provider may transmit interactive request data such as in the form of supplemental audio content. This request may include at least an identifier unique from other identifiers transmitted as part of other pieces of supplemental audio content, thus allowing a feedback server to identify the particular supplemental audio content that has been received. This request may be transmitted via the same communication route through which television programming is distributed. For example, referring to FIG. 1, such a request may be transmitted as part of a transponder stream via satellite 130-1 through which television programming is distributed. The request may be transmitted as one or more packets, each having an identifier indicative of the request corresponding to a particular television channel. Further, at block 510, this request may be received by a television receiver and filtered. If a user of the television receiver has disabled the interactive feedback system, packets of data pertaining to the interactive request data may be ignored. If enabled and pertinent to content being viewed by a viewer of the television receiver, the television receiver may filter and process such packets.

At block 520, the television receiver may generate and output an ultrasonic trigger message based on the received, filtered, and processed interactive request data (e.g., supplemental audio content). The ultrasonic trigger message may be output by an on-board ultrasonic audio transducer to an external audio system that generates ultrasonic sound. In other embodiments, the sound is within the audible range of humans. In some embodiments, the television receiver may append data to the ultrasonic trigger message that includes an identifier of the television receiver.

At block 530, one or more mobile devices within range of the television receiver may receive the ultrasonic trigger message. The one or more mobile device may have an active microphone that is used to monitor a particular frequency range for such ultrasonic trigger messages. The ultrasonic trigger message may be decoded and analyzed by the mobile device.

At block 540, the mobile device may request and receive interactive content based on the ultrasonic trigger message. The request may include: an identifier included in the ultrasonic trigger message that differentiates the ultrasonic trigger message from other ultrasonic trigger messages, an identifier of the television receiver, and/or an identifier of a user account associated with the mobile device. The request may be sent via a network different from the network through which the trigger message was transmitted to the television receiver. For example, the request may be sent to the feedback server via the Internet, while the supplemental audio content was received via a satellite- or cable-based television programming distribution system. Interactive content may be sent to the mobile device by the feedback server based on the request. The mobile device may then present the interactive interface that solicits feedback from the viewer. This interactive interface may be presented at the same time that matching content is presented by the presentation device that is receiving video from the television receiver. For example, the interactive interface may solicit for feedback on a new truck commercial while the new truck commercial is being output by a television that is in communication with the television receiver.

At block 550, input may be received from the viewer. The input may be provided to the mobile device. The feedback may be transmitted to the feedback server at block 560. In some embodiments, rather than an interactive interface being provided at block 540, supplemental information regarding the content output by the television receiver to the presentation device is presented on the mobile device. The viewer may not be requested or required to provide feedback in response to the content presented on the mobile device.

Figure 6:
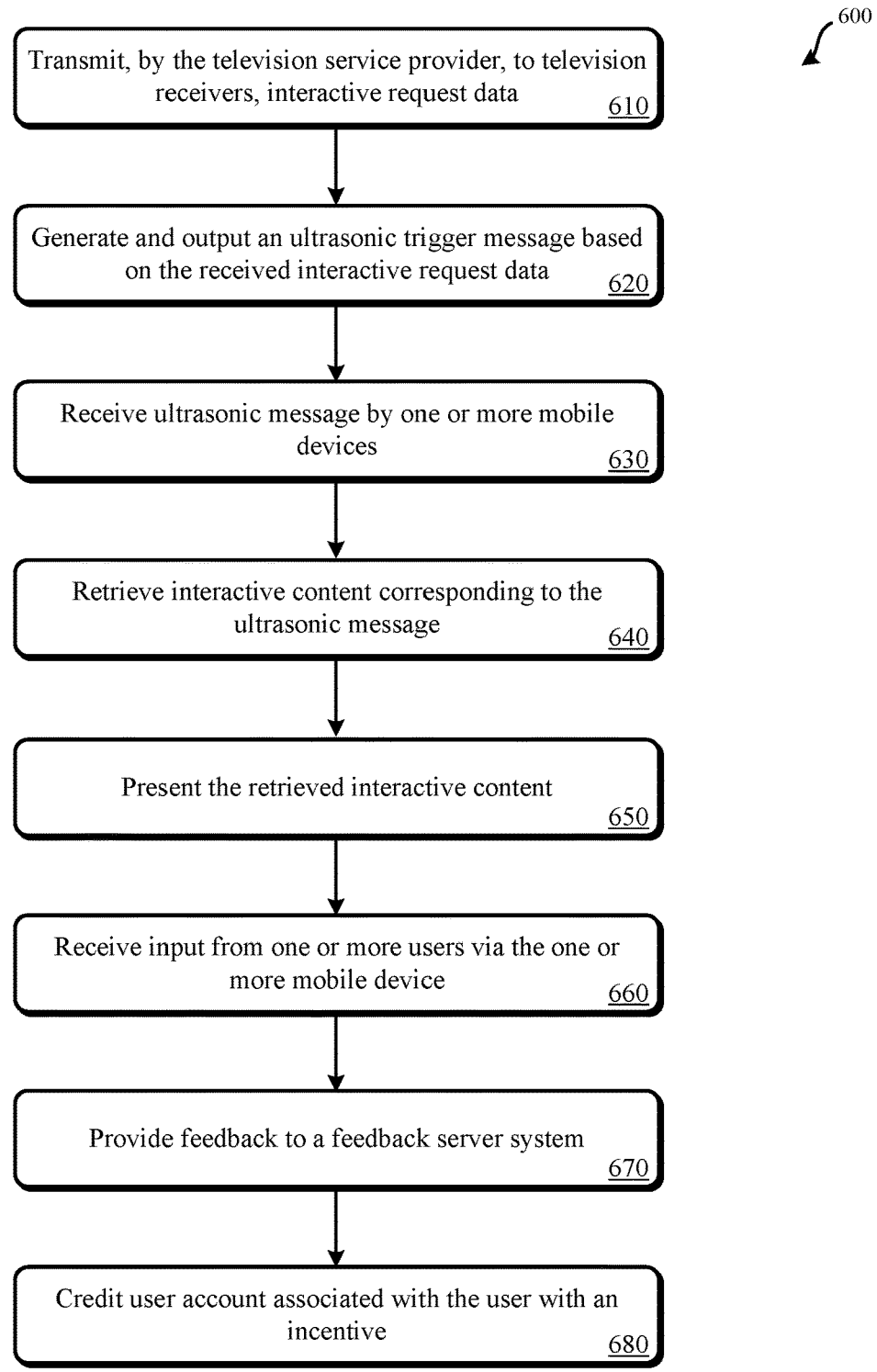
FIG. 6 illustrates another embodiment of a method for using audio signals to provide interactive content to one or more end users via mobile devices.

FIG. 6 illustrates another embodiment of a method 600 for using audio signals to provide interactive content to one or more end users via mobile devices. Method 600 may be performed using satellite television distribution system 100, television receiver 200, and/or systems 300 and 400. Method 600 can represent a more detailed embodiment of method 500.

At block 610, a television service provider may transmit interactive request data, such as in the form of supplemental audio content. This request may include at least an identifier unique from other identifiers transmitted as part of other pieces of supplemental audio content, thus allowing a feedback server to identify the particular supplemental audio content that has been received. This request may be transmitted via the same communication route through which television programming is distributed. For example, referring to FIG. 1, such a request may be transmitted as part of a transponder stream via satellite 130-1 through which television programming is distributed. The request may be transmitted as one or more packets, each having an identifier indicative of the request corresponding to a particular television channel. In other embodiments, the audio content may be supplemental as part of the audio stream of television programming. Therefore, at block 610, the television service provider is supplementing the television programming with supplemental audio content which may or may not be used by television receivers, depending on user preference settings.

Further, at block 610, this supplemental audio content may be received by a television receiver and filtered. If a user of the television receiver has disabled the interactive feedback system, packets of data pertaining to the interactive request data may be ignored. If enabled and pertinent to content being viewed by a viewer of the television receiver, the television receiver may filter and process such packets.

At block 620, the television receiver may generate and output an ultrasonic trigger message based on the received interactive request data (e.g., supplemental audio content). The ultrasonic trigger message may be output by an on-board ultrasonic audio transducer to an external audio system that generates ultrasonic sound. In other embodiments, the sound is within the audible range of humans. In some embodiments, the television receiver may append data to the ultrasonic trigger message that includes an identifier of the television receiver.

At block 630, one or more mobile devices within range of the television receiver may receive the ultrasonic trigger message. The one or more mobile devices may have an active microphone that is used to monitor a particular frequency range for such ultrasonic trigger messages. The ultrasonic trigger message may be decoded and analyzed by the mobile device. In some embodiments, a different form of communication link may be used instead of ultrasonic audio. For example, Bluetooth® or some other form of local wireless communication may be used.

At block 640, the mobile device may request and retrieve interactive content based on the ultrasonic trigger message. The request may include: an identifier included in the ultrasonic trigger message that differentiates the ultrasonic trigger message from other ultrasonic trigger messages, an identifier of the television receiver, and/or an identifier of a user account associated with the mobile device. The request may be sent via a different network than through which the trigger message was transmitted to the television receiver. For example, the request may be sent to the feedback server via the Internet, while the supplemental audio content was received via a satellite- or cable-based television programming distribution system. Interactive content may be sent to the mobile device by the feedback server based on the request.

The mobile device may present the interactive content, such as an interactive interface, that solicits feedback from the viewer at block 650. This interactive interface may be presented at the same time that matching content is presented by the presentation device that is receiving video from the television receiver. For example, the interactive interface may solicit for feedback on a new truck commercial while the new truck commercial is being output by a television that is in communication with the television receiver.

At block 660, input may be received from the viewer. The input may be provided to the mobile device. The feedback may be transmitted to the feedback server at block 670. At block 680, a user account associated with the user of the mobile device may be credited with an incentive value in exchange for the user providing the feedback. The user account credited with the incentive may be a user account associated with the mobile device or a master account that has been linked to multiple mobile devices. For example, each mobile device of a family may be linked to a common master account such that the family pools incentives that each member of the family has earned.

Figure 7:
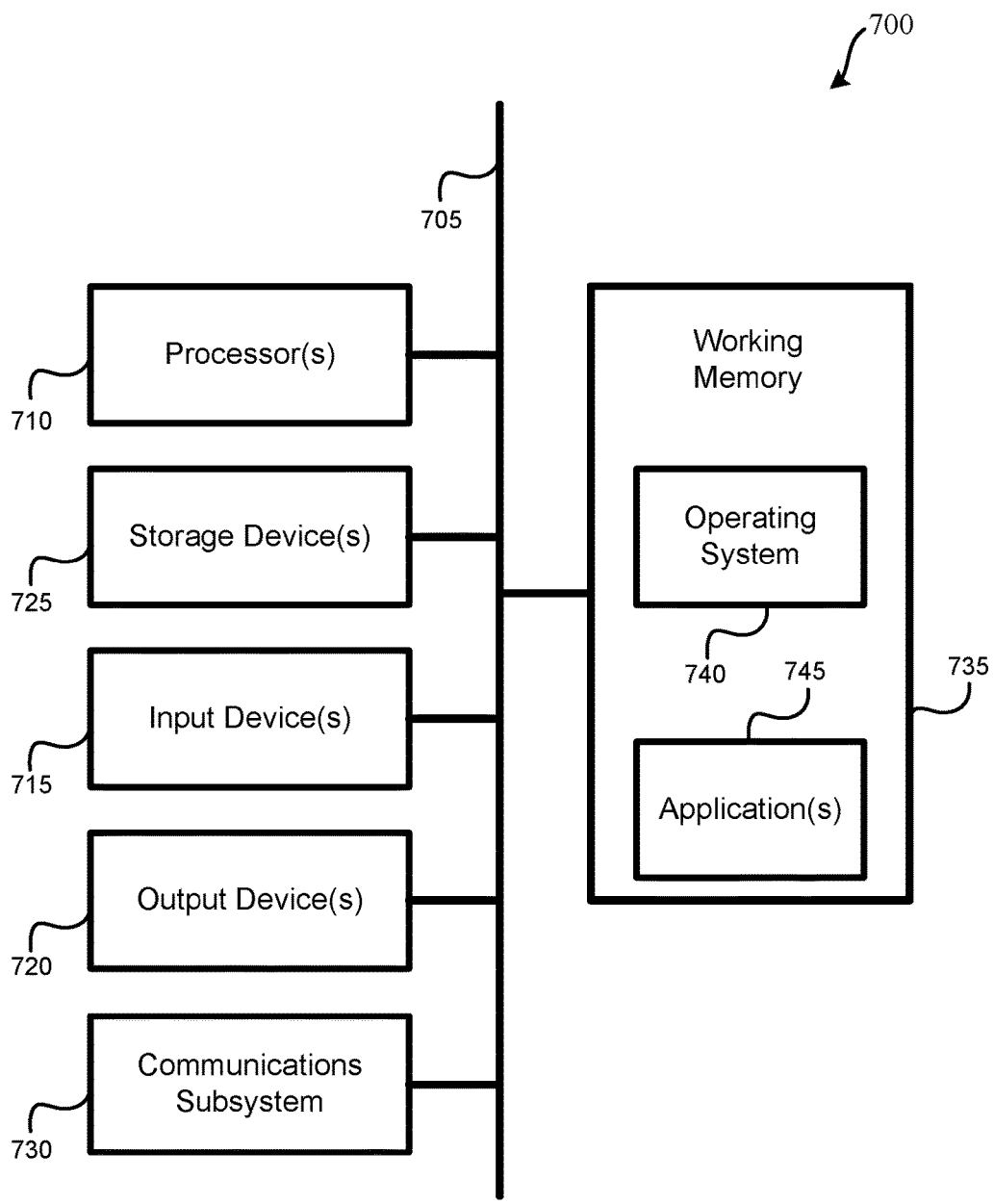
FIG. 7 illustrates an embodiment of a computer system that may be incorporated as part of the television receiver, mobile device, and television service provider feedback system.

A computer system as illustrated in FIG. 7 may be incorporated as part of the previously described computerized devices, such as television service provider system 110, content provider system 111, set top box 150, television receiver 200, feedback server 340, and mobile devices 320 and 420. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a touchscreen, keyboard, remote control, and/or the like; and one or more output devices 720, which can include without limitation a display device, a printer, etc.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for providing interactive content to viewers of television programming:
   supplementing, by a television service provider system, broadcast television programming with a supplemental audio signal, wherein the supplemental audio signal is not part of the broadcast television programming as received by the television service provider system from a content provider;
   broadcasting, by the television service provider system, a data stream comprising the broadcast television programming and the supplemental audio signal via a television programming distribution network;
   receiving, by a television receiver, the data stream comprising the broadcast television programming and the supplemental audio signal;
   appending, by the television receiver, a television receiver identifier to the supplemental audio signal, wherein the television receiver identifier identifies the television receiver;
   outputting, by an ultrasonic transducer of the television receiver, the supplemental audio signal with the appended television receiver identifier as ultrasonic sound, wherein:
      output of the ultrasonic sound by the ultrasonic transducer of the television receiver is not affected by user-set mute and volume settings provided to a separate audio system; and
      the television receiver is distinct from a television;
   outputting, by the television receiver, the broadcast television programming to the television;
   detecting, by a plurality of mobile devices, the supplemental audio signal using an on-board microphone of each of the plurality of mobile devices, wherein:
      each mobile device of the plurality of mobile devices is used by a different viewer of a plurality of viewers;
   in response to the received supplemental audio signal, accessing, by each mobile device of the plurality of mobile devices, interactive content, wherein the interactive content requests a response from the viewer using each mobile device;
   receiving, by the television service provider system, a plurality of responses from the plurality of viewers that are associated with a plurality of user accounts and the appended television receiver identifier transmitted via a network distinct from the television programming distribution network; and
   pooling, by the television service provider system, a plurality of incentive values awarded for each response of the plurality of responses such that the plurality of incentive values are awarded to a master account associated with the television receiver.

2. The method for providing interactive content to viewers of the television programming of claim 1, further comprising: in response to receiving the response from the viewer transmitted via the network, crediting a user account linked with the viewer with an incentive value.

3. The method for providing interactive content to viewers of the television programming of claim 1, wherein supplementing the supplemental audio signal with the television programming comprises identifying each packet of the supplemental audio signal using a packet identifier (PID) distinct from one or more PIDs that identify one or more audio programs of the television programming.

4. The method for providing interactive content to viewers of the television programming of claim 1, further comprising: executing, on each mobile device of the plurality of mobile devices, an application that monitors for audio within a particular frequency range, wherein the supplemental audio signal is received by the mobile device within the particular frequency range.

5. The method for providing interactive content to viewers of the television programming of claim 1, wherein the interactive content requests information from the viewer about the television programming.

6. The method for providing interactive content to viewers of the television programming of claim 1, wherein an incentive value for at least some viewers of the plurality of viewers differs based on demographic groups in which each viewer of the plurality of viewers is a member.

7. An interactive content system, comprising:
   a television receiver, comprising:
      one or more tuners;
      an ultrasonic transducer;
      one or more processors; and
      a memory communicatively coupled with and readable by the one or more processors and having stored therein processor-readable instructions which, when executed by the one or more processors, cause the one or more processors to:

receive a data stream comprising broadcast television programming and a supplemental audio signal transmitted by a television service provider system in association with the broadcast television programming, wherein the broadcast television programming and the supplemental audio signal is received via the one or more tuners from a television programming distribution network;

append a television receiver identifier to the supplemental audio signal, wherein the television receiver identifier identifies the television receiver;

output the supplemental audio signal with the appended television receiver identifier via the ultrasonic transducer as ultrasonic sound, wherein:

output of the ultrasonic sound by the ultrasonic transducer of the television receiver is not affected by user-set mute and volume settings provided to a television; and output the broadcast television programming for presentation to a display device;

a plurality of mobile devices, wherein each mobile device of the plurality of mobile devices is operated by a different viewer of a plurality of viewers and is configured to:

detect the supplemental audio signal using an on-board microphone of the mobile device;

in response to detecting the supplemental audio signal, access interactive content, wherein the interactive content requests a response from a viewer; and transmit a response to the interactive content and the appended television receiver identifier to the television service provider system via a network distinct from the television programming distribution network; and the television service provider system that:

receives a plurality of responses from the plurality of mobile devices that are associated with a plurality of user accounts and the appended television receiver identifier; and pools a plurality of incentive values awarded for each response of the plurality of responses such that the plurality of incentive values are awarded to a master account linked with the television receiver.

8. The interactive content system of claim 7, further comprising the television service provider system that supplements the broadcast television programming with the supplemental audio signal, wherein the supplemental audio signal is not part of the television programming as received by the television service provider system from a content provider.

9. The interactive content system of claim 8, wherein supplementing the broadcast television programming with the supplemental audio signal comprises identifying each packet of the supplemental audio signal using a packet identifier (PID) distinct from one or more PIDs that identify one or more audio programs of the broadcast television programming.

10. The interactive content system of claim 7 wherein the television receiver further comprises a packet identifier (PID) filter that is configured to capture packets from the one or more tuners for processing that are associated with a PID of the supplemental audio signal in response to supplemental audio content being enabled.

11. The interactive content system of claim 7, wherein each mobile device of the plurality of mobile devices is further configured to execute an application that monitors for audio within a particular frequency range, wherein the supplemental audio signal is received by the mobile device within the particular frequency range.

12. The interactive content system of claim 7, wherein each mobile device of the plurality of mobile devices being configured to: access the interactive content comprises determining a supplemental content identifier included in the supplemental audio signal; and transmit the supplemental content identifier to the television service provider system.

13. The interactive content system of claim 7, wherein an incentive value for at least some viewers of the plurality of viewers differs based on demographic groups in which each viewer of the plurality of viewers is a member.

* * * * *